United States Patent [19]

Langenberg

[11] Patent Number: 4,939,949
[45] Date of Patent: Jul. 10, 1990

[54] PLANETARY OVERRIDING GEARING AND OVERRIDING DRIVING FOR CHAIN BELTS AND THE LIKE, PARTICULARLY FOR CHAIN CONVEYORS AND CHAINDRAWN MINING MACHINES

[75] Inventor: Werner Langenberg, Werne, Fed. Rep. of Germany

[73] Assignee: Gewerkschaft Eisenhutte Westfalia GmbH, Fed. Rep. of Germany

[21] Appl. No.: 305,786

[22] Filed: Feb. 2, 1989

[30] Foreign Application Priority Data

Feb. 11, 1988 [DE] Fed. Rep. of Germany ....... 3804168

[51] Int. Cl.[5] .............................................. F16H 37/06
[52] U.S. Cl. .......................................... 475/2; 475/5; 475/10
[58] Field of Search ................... 74/675, 714; 198/330, 198/856, 810

[56] References Cited

U.S. PATENT DOCUMENTS

| | | | |
|---|---|---|---|
| 2,398,346 | 4/1946 | Anderson | 74/675 X |
| 2,399,685 | 5/1946 | McCoy | 74/675 X |
| 3,298,257 | 1/1967 | Moss | 74/675 |
| 3,658,166 | 4/1972 | Hara et al. | 198/330 X |
| 4,056,759 | 11/1977 | Mitsui et al. | 198/330 X |
| 4,508,205 | 4/1985 | Aulagner et al. | 198/810 X |
| 4,605,358 | 8/1986 | Burandt | 74/675 X |

Primary Examiner—Dirk Wright
Attorney, Agent, or Firm—Samuels, Gauthier, & Stevens

[57] ABSTRACT

A high performance drive system for a mineral mining installation employs separate main and auxiliary drives with wheels around with a chain is entrained. Each drive is composed of an asynchronous motor and spur gearing. An additional over-ride planetary gearing unit is incorporated in at least one of the drives to distribute loading as evenly as possible. The planetary gearing is operable to provide a transmission ratio which can be varied in accordance with load or rotational speed of the drive(s). The planetary gearing unit has two sets of planet wheels on a common carrier. One set of planet wheels mesh with an input sun wheel and the other set of wheels mesh with an output sun wheel. The sets of planet wheels are disposed so that one wheel of one set meshes with an adjacent wheel of the other set. A further control motor drives a pinon which meshes with the carrier and this further motor is operated in accordance with e.g. the load or rotational speed of the drive(s). With the further motor stationary the transmission ratio of the planetary gearing is 1:1.

12 Claims, 4 Drawing Sheets

PLANETARY OVERRIDING GEARING AND OVERRIDING DRIVING FOR CHAIN BELTS AND THE LIKE, PARTICULARLY FOR CHAIN CONVEYORS AND CHAINDRAWN MINING MACHINES

FIELD OF THE INVENTION

The present invention relates to drive systems for endless traction members, such as chains or belts, as used in underground mineral mining installations and to over-ride planetary gearing usable in such systems.

BACKGROUND OF THE INVENTION

In high-performance chain drive systems for mining machinery, it is known to use separate main and auxiliary drives usually at the end regions of a working face. Each drive may have an asynchronous electric motor and a gearing unit, usually spur gearing, which drives a sprocket wheel around which the chain is entrained. The drive or traction chain tends to be subject to uneven loads and the electrical power cannot be used efficiently under these circumstances without some compensation. The asynchronous motors are unregulated but the common drive chain causes the drives to be synchronised. Sometimes, the total length of the chain is sub-divided into sections with different elongations and because of the forced synchronisation of the drives there is imbalance in the loading of the drives. Asynchronous motors are sensitive to changes in loading and even small imbalance will caused one or both of the motors to run under partial loading. Under extreme conditions, one of the motors can even act as a generator. In order to utilise the electrical power efficiently and to distribute loading evenly between the drives it is known to employ an over-ride gearing or drive usually with planetary gearing which is driven in accordance with load or rotational speed see Glückauf 1979 p. 456–460; 1981 p. 386–388; 1986 p. 875–880 and 849–859 and 1974 p. 239–243. A general object of the invention is to provide an improved drive system and gearing unit.

SUMMARY OF THE INVENTION

In accordance with the invention a planetary gearing unit is used to over-ride the drive between one of the asynchronous motors and the main gearing usually spur gearing, and this planetary gearing unit provides a 1:1 transmission ratio when control is not necessary. The planetary gearing unit can be a compact construction conveniently interposed between the drive motor and the main gearing unit. A further control motor, electrical or hydraulic, serves to regulate the transmission ratio of the planetary gearing unit. This control motor can be operated in accordance with the sensing of load and/or rotational speed of one or more drive motors or the overall drive. An electronic unit can be provided to evaluate the sensor signals and to provide a control signal to operate the further motor. When the further motor is inoperative and stationary the planetary gearing has the transmission ratio of 1:1. The further motor can drive a pinion which meshes with a toothed rim of a planetary wheel carrier of the gearing unit.

The planetary gearing unit can be employed with a main gearing unit of the type which has overload protection which interrupts the drive in the event of an overload. Such overload protection is known from U.S. Pat. Nos. 4682678, 4614134, 4601218, 4667790 and GB patent specification 2141199.

In a preferred construction the over-ride planetary gearing unit has an co-axial input and an output shaft each carrying an identical sun wheel. The sun wheels are closely spaced. Sets of planet wheels on a common carrier mesh with the respective sun wheels. The planet wheels are identical with a tooth width substantially greater than the sun wheels. The planet wheel sets are offset axially with one wheel of one set meshing with an adjacent wheel of the other set as well as the associated sun wheel. With the carrier stationary, drive on the input sun wheel is imparted via the sets of planet wheels to the output sun wheel with the same speed and direction. Since the planet wheels of the respective sets rotate in opposite directions the carrier is not subjected in any resultant reactive torque. By moving the carrier via the pinion and further motor in one direction or the other, the transmission ratio can be varied to provide a reduction or increase to drive the chain drive wheel at a slower or faster speed whereby to compensate for imbalance. Instead of having sets of planet wheels each meshing simultaneously with one of the sun wheels and with an adjacent planet wheel of the other set it is possible to have a pair of planet wheels on each planet wheel axis of each set one meshing with the associated sun wheel and the other with an adjacent planet wheel of the other set.

The further control motor can be united with the planetary gearing unit housing to lie parallel to the axis of the input and output shafts.

The invention may be understood more readily, and various other aspects and features of the invention may become apparent, from consideration of the following description.

BRIEF DESCRIPTION OF DRAWINGS

An embodiment of the invention will now be described, by way of example, only, with reference to the accompanying drawings, wherein.

DESCRIPTION OF PREFERRED EMBODIMENT

Figure 1:
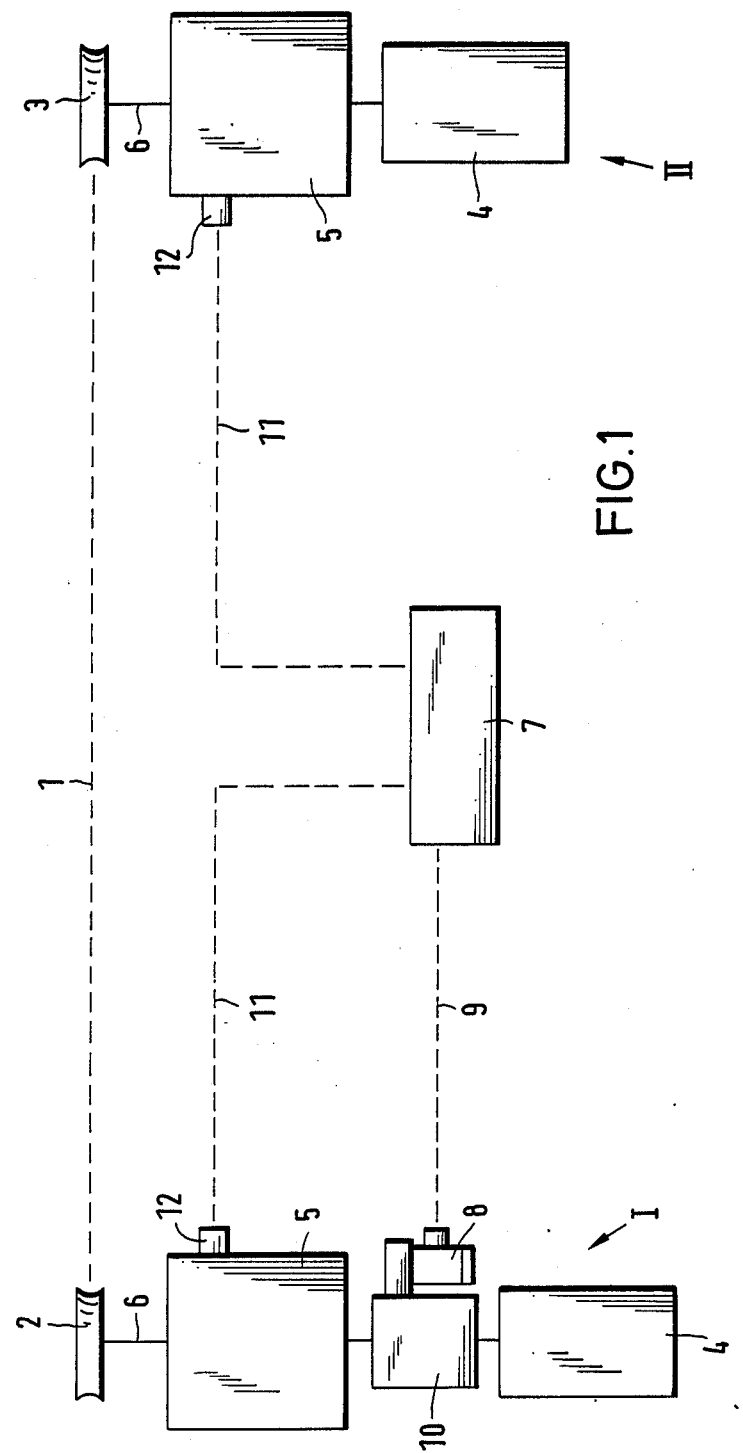
FIG. 1 is a simplified schematic diagram representing a drive system constructed in accordance with the invention.

As shown in FIG. 1, an endless drive or traction member 1 such as a chain or belt is entrained around wheels 2,3 of separate drives means I, II, the member 1 is circulated as is known to propel a machine, such as a plough or shearer, back and forth alongside a mineral, e.g. a coal, face in an underground mine working. The drive member 1 can be alternatively, one or more chains of a scraper-chain assembly of a conveyor. The drive means I constitutes the main drive and the drive means II constitutes the auxiliary drive. Each drive I, II employs an electric asynchronous rotor 4 which drives the wheels 2,3 via gearing units 5. The motors 4 can have the same rating and nominal rotational speed. The gearing units 5 employ spur gears and each unit 5 employs overload protection means with a clutch which breaks the drive connection between an output shaft 6 carrying the wheel 2,3 and the input to the unit 5 in the event of an overload caused, for example, by jamming of the drive member 1. The overload protection means may be of known design and may employ a device to sense the dynamic torque on the shaft 6. Conveniently, the sensing device is a component such as a rod or pin equipped with a strain gauge or the like housed in the unit 5. The sensing device produces an electrical signal which is evaluated to detect the onset of an overload and actuates the clutch if an overload should occur.

The drive system has an electronic control unit 7 which operates a small servo-motor 8 via a control line 9. The motor 8 is operably associated with an over-ride planetary gearing unit 10 interposed between the input of the unit 5 and the output of the drive motor 4 of the main drive 1. The motor 8 can be electric or hydraulic capable of being driven at a regulated speed in either rotational direction. Although only the main drive I is shown as equipped with the unit 10 it is possible to provide each drive I, II with such a unit 10. The unit 7 controls the or each motor 8 in accordance with the torque power or rotational speed of the motors 4. The drive current of the motors 4 can be used as the monitored parameter. FIG. 1 merely shows schematically, and by way of example, sensors 12 on the units 5 which measure the torque passing through the units and lines 11 which transmit the measured values to the control unit 7.

Figure 2:
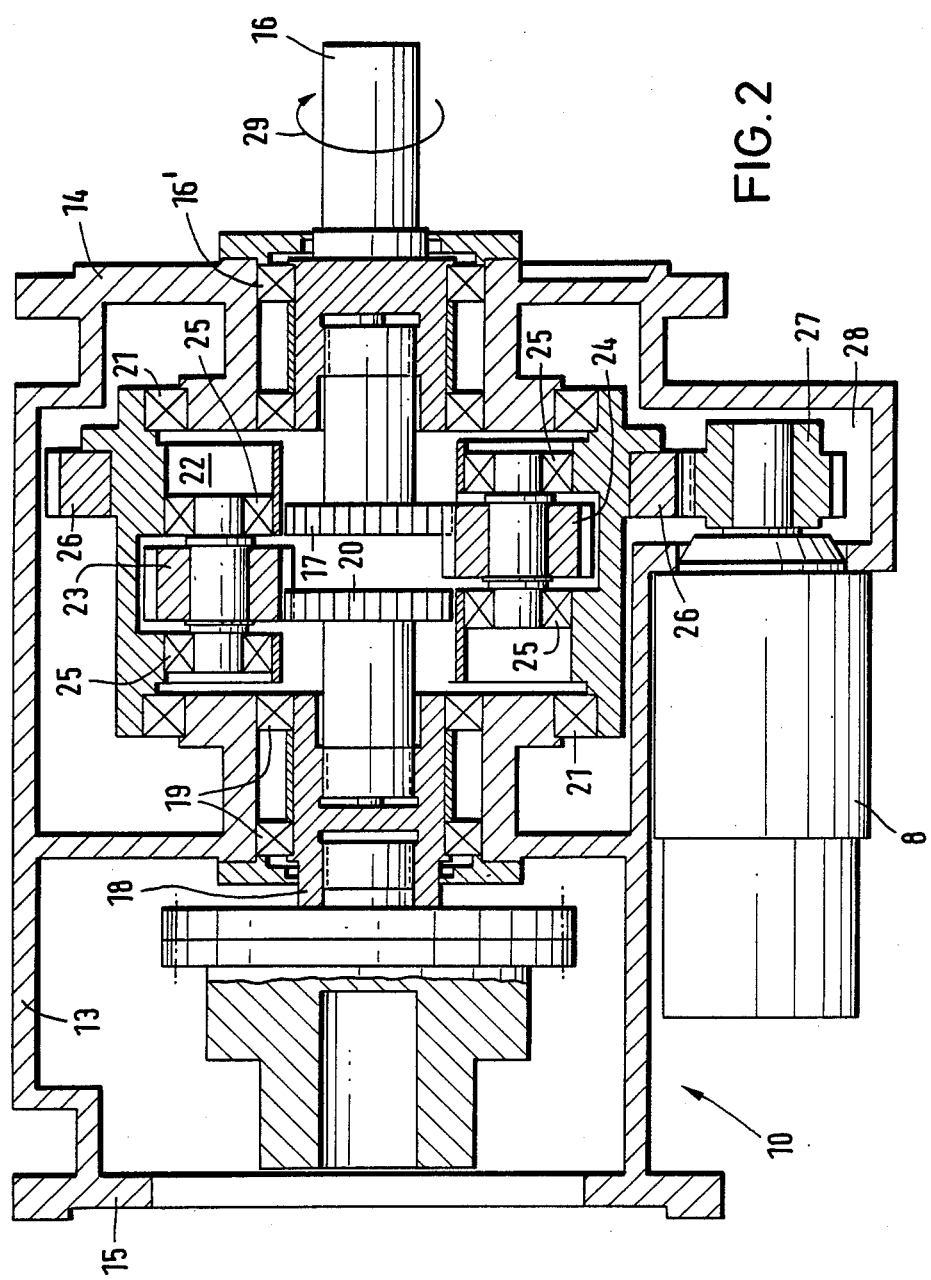
FIG. 2 is a sectional view of a planetary gearing unit used in the system shown in FIG. 1.
Figure 3:
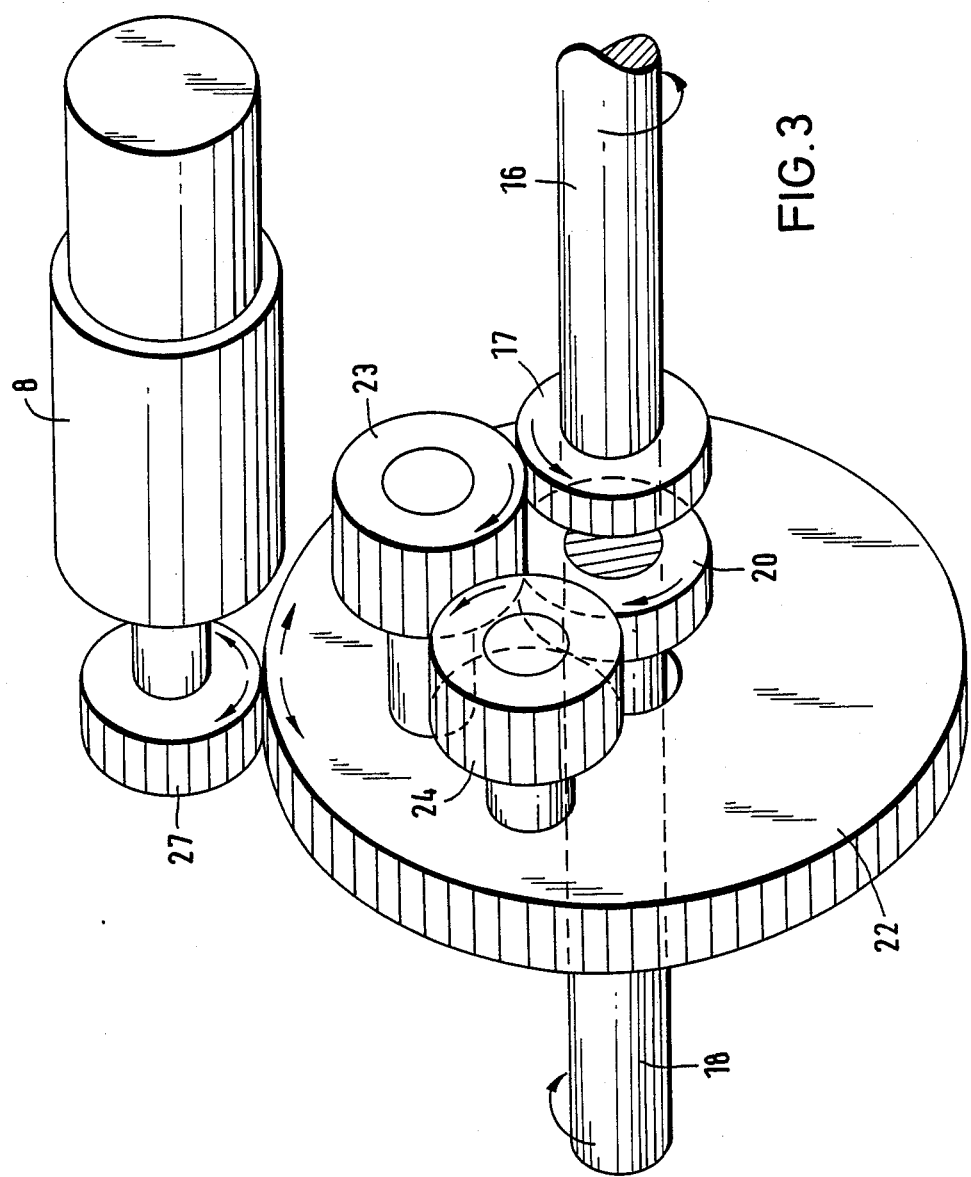
FIG. 3 is a simplified perspective view of the gearing unit shown in FIG. 2.
Figure 4:
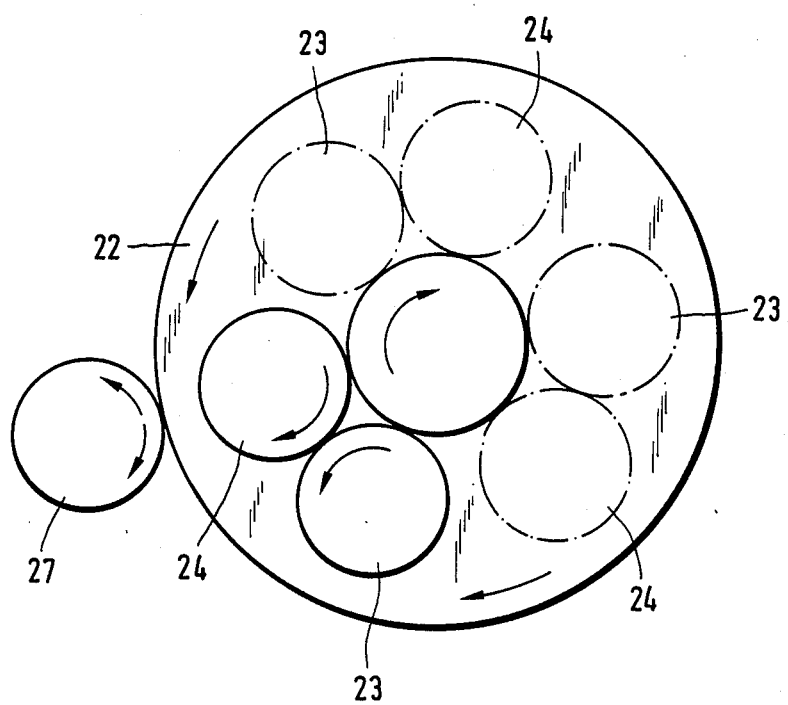
FIG. 4 is a schematic representation of the gearing unit shown in FIGS. 2 and 3.

FIGS. 2 to 4 represent the planetary gearing unit 10 driven by both the motors 4 and 8. As shown in FIGS. 2 to 4, the unit 10 has a housing 13 with an end mounting flange 14 for securing to the motor 4 and an end mounting flange 15 for securing to the gearing unit 5. The unit 10 has an input shaft 18 driven by the motor 4 and carrying a sun wheel 17. Another sun wheel 20, with the same diameter and teeth as the wheel 18, is disposed co-axial to the wheel 18 and is supported on an output shaft 18 mounted in bearings 19. A planet carrier 22 is mounted in bearings 21 to rotate about the axis of the shafts 18,16. The carrier 22 supports two sets of identical planet wheels 23,24 each mounted in bearings 25 to rotate about axes parallel to the axis of the shafts 18,16. Preferably, some three planet wheels 23,24 are provided in each set with the individual wheels 23,24 of each set disposed symmetrically around the axis of the shafts 18,16 with their axes 120° apart. As shown in FIG. 4 the wheels 23,24 of the sets are disposed in alternation with one another around the axis of the shafts 18,16. The sets of planet wheels 23,24 lie in planes offset from one another along the axis of the shafts 18,16 by a distance equal to approximately one half the tooth width of the planet wheels 23,24. The wheels 23 mesh with the sun wheel 20, while the wheels 24 mesh with the sun wheel 17 and each wheel 23,24 of one set meshes with the adjacent wheel 24,23 of the other set. The sun wheels 17,20 are quite close together spaced apart by less than the tooth width of the planet wheels 27,24.

The carrier 22 is provided with a toothed rim 26 on its exterior periphery which meshes with a pinion 27 driven by the motor 8. The pinion 27 is disposed in a subchamber 28 of the housing 13 which is defined by walls which project outwardly from the main chamber of the housing 13 and the motor 8 is accommodated alongside the inner side wall of chamber 28. The motor 8 drives the pinion 27 directly and has its rotational axis parallel to the axis of the shafts 16,18.

The gearing arrangement as described has a transmission ratio of 1:1 with the carrier 22 held stationary. Thus when the motor 8 is not operating the rotational speed of the motor 4 is transferred without alteration to the input of the unit 5 and any reduction in the drive ratio is affected solely by this unit 5. During operation and with the shaft 16 rotating clockwise in the direction of arrow 29 in FIG. 2 the planet wheels 24 which mesh with the sun wheel 17 rotate in the opposite direction. As the wheels 24 mesh with the wheels 23 the latter also rotate clockwise in the direction of arrow 29. The wheels 23 cause the sun wheel 20 to rotate in the counter-clockwise direction and this is imparted to the shaft 18. The carrier 22 is subjected to reactive torques by the wheels 23,24 but these are in opposite directions and tend to negate one another so the carrier 22 remains stationary so long as the motor 8 imparts no drive to the pinion 27. If the control unit 7 detects imbalance between the units 5 the motor 8 is caused to drive the pinion 27 in one or other direction to rotate the carrier 22 in one direction or the other at controlled speed to increase or decrease the transmission or drive ratio of the unit 10. The motor 4 can then rotate at its designed optimum speed with the motor 8 varying the ratio of the over-ride unit 10 to compensate for imbalance caused by loading.

I claim:

1. In a drive system for propelling an endless traction member of a mineral mining installation having main and auxiliary drives each composed of an electric asynchronous drive motor and a gearing unit; the improvement comprising a planetary gearing unit interposed between at least one of the motors and an associated gearing unit, a further control motor operably associated with the planetary gear unit, the planetary gearing unit comprising an input shaft with a first sun wheel, an output shaft with a second sun wheel, sets of planet wheels meshing with the respective first and second sun wheels with planet wheels of one set also meshing with planet wheels of the other set, a common carrier for the sets of planet wheels, means drivably coupling the carrier to the control motor and means for sensing a load parameter derived from loading of at least one of the drive motors and indicative of imbalance between the drives and for operating the control motor to rotate the carrier; whereby the sensing means and the control motor co-operate to regulate the planetary gearing drive ratio from a value of 1:1 when the control motor is inoperative to cause the planetary gearing to override the drive ratio of said associated gearing to compensate for the sensed load parameter.

2. A drive system according to claim 1, wherein the sun wheels are coaxial and have the same diameter.

3. A drive system according to claim 1, wherein the carrier has a toothed peripheral rim which meshes with a pinion driven by the control motor.

4. A drive system according to claim 1, wherein the tooth width of the sets of planet wheels is greater than the sun wheels.

5. A drive system according to claim 2, wherein the sets of planet wheels are disposed in different planes offset along the axis of the sun wheels with each wheel of one set meshing with an adjacent wheel of the other set.

6. A drive system according to claim 1, wherein there are a plurality of planet wheels in each set.

7. A drive system according to claim 5, wherein the sun wheels are spaced apart by a distance less than the tooth width of the planet wheels.

8. A drive system according to claim 1, wherein the planetary gearing is disposed in a housing with co-axial input and output shafts extending in opposite directions and the control motor is mounted to the housing in a position parallel to the shafts.

9. A drive systems according to claim 8, wherein the input and output shafts pass through flanges for mounting to the drive motor and to the gearing unit.

10. A drive system according to claim 3, wherein the control motor is capable of driving the pinion in either direction at selectable speed.

11. A drive system according to claim 1, wherein the gearing unit is provided with an integrated overload protection means which separates the input and the output of the unit in the event of overloading.

12. A drive system according to claim 1, wherein the sensing means senses load and/or rotational speed.

* * * * *